US010225689B2

United States Patent
Du et al.

(10) Patent No.: US 10,225,689 B2
(45) Date of Patent: Mar. 5, 2019

(54) GEOGRAPHIC POSITION INFORMATION-BASED COMMUNITY INTERCONNECTION METHOD AND SYSTEM

(71) Applicant: Huizhou TCL Mobile Communication Co., LTD, Hui Zhou (CN)

(72) Inventors: Zhimin Du, Hui Zhou (CN); Jianyu Zou, Hui Zhou (CN)

(73) Assignee: HUIZHOU TCL MOBILE COMMUNICATION CO., LTD, Hui Zhou (CN)

( * ) Notice: Subject to any disclaimer, the term of this patent is extended or adjusted under 35 U.S.C. 154(b) by 0 days.

(21) Appl. No.: 15/564,689

(22) PCT Filed: Sep. 5, 2016

(86) PCT No.: PCT/CN2016/098019
§ 371 (c)(1),
(2) Date: Oct. 5, 2017

(87) PCT Pub. No.: WO2017/054619
PCT Pub. Date: Apr. 6, 2017

(65) Prior Publication Data
US 2018/0199153 A1    Jul. 12, 2018

(30) Foreign Application Priority Data
Sep. 29, 2015    (CN) .......................... 2015 1 0631463

(51) Int. Cl.
*H04W 4/00* (2018.01)
*H04W 4/021* (2018.01)
(Continued)

(52) U.S. Cl.
CPC ............. *H04W 4/021* (2013.01); *G01S 19/42* (2013.01); *G06Q 50/01* (2013.01); *H04L 67/16* (2013.01); *H04L 67/18* (2013.01); *H04W 64/003* (2013.01)

(58) Field of Classification Search
CPC ..... H04W 4/021; H04W 64/003; G01S 19/42; G06Q 50/01; H04L 67/16; H04L 67/18
See application file for complete search history.

(56) References Cited

U.S. PATENT DOCUMENTS 8,396,490 B2 * 3/2013 Platt .................... G06Q 10/107
455/414.2
9,118,735 B1 * 8/2015 McInerny .............. G06Q 50/01
(Continued)

FOREIGN PATENT DOCUMENTS

| CN | 103248671 A | 8/2013 |
| CN | 103745014 A | 4/2014 |

(Continued)

*Primary Examiner* — Khai M Nguyen
(74) *Attorney, Agent, or Firm* — Shimokaji IP

(57) ABSTRACT

A geographic position information-based community interconnection method may comprise creating a community network using geographic position information and identity information as network nodes; when a user terminal logs onto the community network for the first time, registration and authentication may need to be completed. The method may include receiving information and/or services for interaction, and uploading the received information and/or services to the community network server. The user terminal may acquire desired information and/or services by searching the information and/or services stored in the visible space.

16 Claims, 2 Drawing Sheets

(51) Int. Cl.
*G01S 19/42* (2010.01)
*G06Q 50/00* (2012.01)
*H04L 29/08* (2006.01)
*H04W 64/00* (2009.01)

(56) References Cited

U.S. PATENT DOCUMENTS

2008/0235351 A1* 9/2008 Banga .................... G06Q 30/02
709/218
2011/0302509 A1* 12/2011 Leacock ................ G06Q 10/10
715/756
2012/0278410 A1* 11/2012 Chung .................. H04W 4/023
709/206

FOREIGN PATENT DOCUMENTS

| CN | 104093125 A | 10/2014 |
|---|---|---|
| CN | 105323308 A | 2/2016 |

* cited by examiner

GEOGRAPHIC POSITION INFORMATION-BASED COMMUNITY INTERCONNECTION METHOD AND SYSTEM

The present application claims the priority of the Chinese present application No. 201510631463.2 filed with the Chinese Patent Office on Sep. 29, 2015 and entitled "Geographic position information-based community interconnection method and system," and its full text is incorporated in the present application by reference.

FIELD OF THE INVENTION

The present invention relates to the field of Internet technologies, and in particular to a geographic position information-based community interconnection method and system.

DESCRIPTION OF THE RELATED ART

As computers and the Internet become popular, computer-aided communications have changed the mode of interpersonal interaction. Relative to the classification of conventional communities, the computer-aided communications have created a new social relationship, "virtual community" or "network community," which includes: asynchronous and non-interactive emails, BBS, news groups, synchronous and interactive Internet chat systems, online games, and social websites. Through a virtual community, users may communicate with each other, for example, in business transactions, hobby sharing, and relationship establishment, all of which may accelerate the implementation of various interaction in a virtual community thanks to the characteristics of the Internet, for example, openness and convenience.

However, current virtual communities may employ anonymity, and as a result, the reliability of various information and information releasers on virtual communities cannot be ensured. It may be difficult for people to tell whether information is true or false, which may make it more difficult to acquire and utilize information, and may make the information dissemination less effective. Therefore, the prior art needs to be improved.

SUMMARY OF THE INVENTION

The technical problem to be solved by the present invention is to, in light of the drawbacks of the prior art, provide a geographic position information-based community interconnection method and system, which can solve the problem that the reliability of various information and information releasers on the current virtual communities cannot be ensured. It may be difficult for people to tell whether information is true or false, making it more difficult to acquire and utilize information and leading to less effective information dissemination.

To solve the above technical problem, the present invention employs the following technical solution:

A geographic position information-based community interconnection method, wherein the geographic position information-based community interconnection method comprises: creating a community network using geographic position information and identity information as network nodes; when a user terminal logs onto the community network for a first time, the user terminal acquires the geographic position information and user identity information of the user terminal to complete registration and authentication. The user terminal receives information and/or services input by a first user for interaction, and uploads the received information and/or services to the community network server, said information and/or services for interaction are stored in a visible space of the user terminal.

When the user terminal logs onto the community network using a registered user account, the user terminal can acquire desired information and/or services by searching the information and/or services stored in the visible space. The user terminal can search for the desired information and/or services, and the user terminal can search for users that need the user terminal to provide services; and the user terminal can establish connection with other users through the geographic position information, and interact directly by clicking a second user's ID.

When the user terminal logs onto the community network for the first time, the user terminal can acquire the geographic position information and user identity information of the user terminal to complete registration.

Authentication of the user identity information may comprise: when the user terminal logs onto the community network for the first time, the user terminal can acquire the geographic position information and user identity information of the user terminal. The user terminal can bundle the geographic position information and user identity information of the user terminal as the user identification to complete registration and authentication. At a same time as acquiring the geographic position information and user identity information of the user terminal, the user terminal can acquire user financial condition information, and perform credit classification on the first user according to the user financial condition information.

When the user terminal logs onto the community network using a registered user account, the user terminal can acquire desired information and/or services by searching the information and/or services stored in the visible space. Acquiring of the desired information by the user terminal can further comprise: when the user terminal logs onto the community network using a registered user account, the user terminal can acquire the geographic position information of the user terminal.

According to the geographic position information of the user terminal, the community server can query if said user information already exists. If the user information does not exist, the user terminal can prompt the user to input the user identity information and generate a user identification. If the user information does exist, according to the basic information provided by the first user, the user terminal can determine whether the first user is permitted to log on, and after the logon, and the user terminal can automatically synchronize the information to the community server.

The user terminal can acquire desired information and/or services by searching the information and/or services stored in the visible space.

The user terminal can acquire desired information and/or services by searching the information and/or services stored in the visible space, verify the credit class of said user terminal, and determine, according to the user terminal credit class, whether to select said information and/or services or provide information and/or services.

A geographic position information-based community interconnection method may comprise: creating a community network using geographic position information and identity information as network nodes. When the user terminal logs onto the community network for a first time, the user terminal can acquire the geographic position information and user identity information of the user terminal to complete registration and authentication.

The user terminal can receive information and/or services input by the first user for interaction, and upload the received information and/or services to the community network server. The information and/or services for interaction can be stored in a visible space of the user terminal; and when the user terminal logs onto the community network using a registered user account, the user terminal can acquire desired information and/or services by searching the information and/or services stored in the visible space.

When the user terminal logs onto the community network for the first time, the user terminal can acquire the geographic position information and user identity information of the user terminal; the user terminal can bundle the geographic position information and user identity information of the user terminal as the user identification to complete registration and authentication.

Acquiring the geographic position information of the user terminal may comprise: determining the geographic position information of the user terminal via the global positioning system GPS.

Acquiring the geographic position information of the user terminal may further comprise: if a current user terminal carries out online business through ADSL, cable TV or mobile network, the user terminal determines the geographic position information of the current user terminal according to the subdistrict identification code ID of the subdistrict in which the current user terminal is located and through an operator.

Acquiring the geographic position information of the user terminal may comprise: acquiring the geographic position information manually input by the first user.

Acquiring the user identity information of the user terminal may comprise: acquiring the identity information of the geographic position owner through the Internet: and acquiring the identity information manually input by the first user.

At the same time as the user terminal acquires the geographic position information and user identity information of the user terminal, the user terminal can acquire user financial condition information, and perform credit classification on the first user according to the user financial condition information.

The visible space may comprise active visible space and passive visible space. Said active visible space can store information, services, and conditions actively exposed by said user terminal to other user terminals; said passive visible space can store various information, services, and conditions released by other user terminals to said user terminal.

When a user terminal logs onto the community network using a registered user account, the user terminal can acquire desired information and/or services by searching the information and/or services stored in the visible space. The acquiring by the user terminal may further comprise:

When the user terminal logs onto the community network using a registered user account, the user terminal can acquire the geographic position information of the user terminal; According to the geographic position information of the user terminal, the community server can query if said user information already exists. If the user information does not exist, the user terminal prompts the first user to input the user identity information and generate a user identification. If the user information does exist, the user terminal, according to the basic information provided by the first user, can determine whether the first user is permitted to log on, and after the logon, the user terminal automatically synchronizes the information to the community server.

The user terminal can acquire desired information and/or services by searching the information and/or services stored in the visible space. The user terminal can acquire desired information and/or services by searching the information and/or services stored in the visible space, verify the credit class of said user terminal, and determine, according to the user terminal credit class, whether to select said information and/or services or provide information and/or services.

A geographic position information-based community interconnection system may comprise: a server, configured to store information of community users; a client, configured to log onto the community server, receive information and/or services input by the first user for interaction, and upload the received information and/or services to the community server, and acquire desired information and/or services by searching the information and/or services stored in the visible space.

The client may be configured to determine the geographic position information of the user terminal via the global positioning system GPS. The client may be configured to, if the user terminal carries out online business through a mobile network, determine the geographic position information of the position where the user terminal is at according to a subdistrict identification code ID of a subdistrict in which the current user terminal is located and through a mobile operator. The client may be further configured to acquire the geographic position information manually input by the first user.

Advantageous effects: relative to the prior art, the geographic position information-based community interconnection method and system provided by the present invention can create a community network using geographic position information and identity information as network nodes. When the user terminal logs onto the community network server for the first time, the user terminal can acquire the geographic position information and user identity information of the user terminal to complete registration and authentication. The user terminal can receive information and/or services input by the first user for interaction. The user terminal can upload the received information and/or services to the community server, and store the received information and/or services in a visible space of the first user.

When the user terminal logs onto the community network using a registered user account, the user terminal can acquire desired information and/or services by searching the information and/or services stored in the visible space. With geographic position information and identity information as network nodes and by performing credit classification on the first user according to the user financial condition information, the geographic position information and identify information can ensure the reliability of information on the community network, which fundamentally solves the problem of reliability of various information and information releasers on the current virtual communities. It is difficult for people to tell whether information is true or false, making it more difficult to acquire and utilize information and leading to less effective information dissemination.

DETAILED DESCRIPTION OF THE SPECIFIC EMBODIMENTS

The present invention provides a geographic position information-based community interconnection method and system. To make the objects, technical solutions and effects of the present invention clearer and more specific, the present invention will be further described in detail below with reference to the accompanying drawings and embodiments. It should be understood that the specific embodiments described herein are only used to explain the present invention, not used to limit the present invention.

The content of the present invention will be further described below with reference to the accompanying drawings and embodiments.

Figure 1:
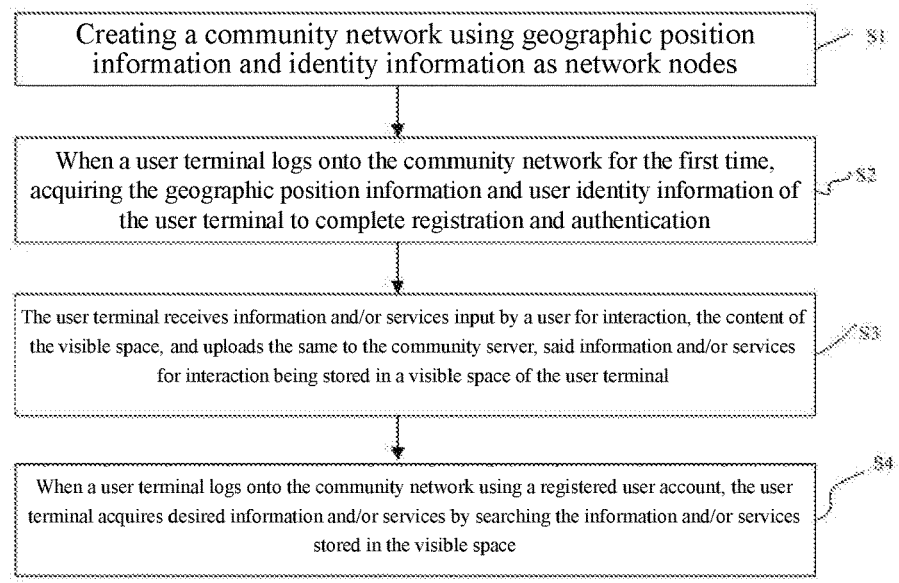
FIG. 1 is a flow chart of an embodiment of the geographic position information-based community interconnection method according to the present invention.
Figure 2:
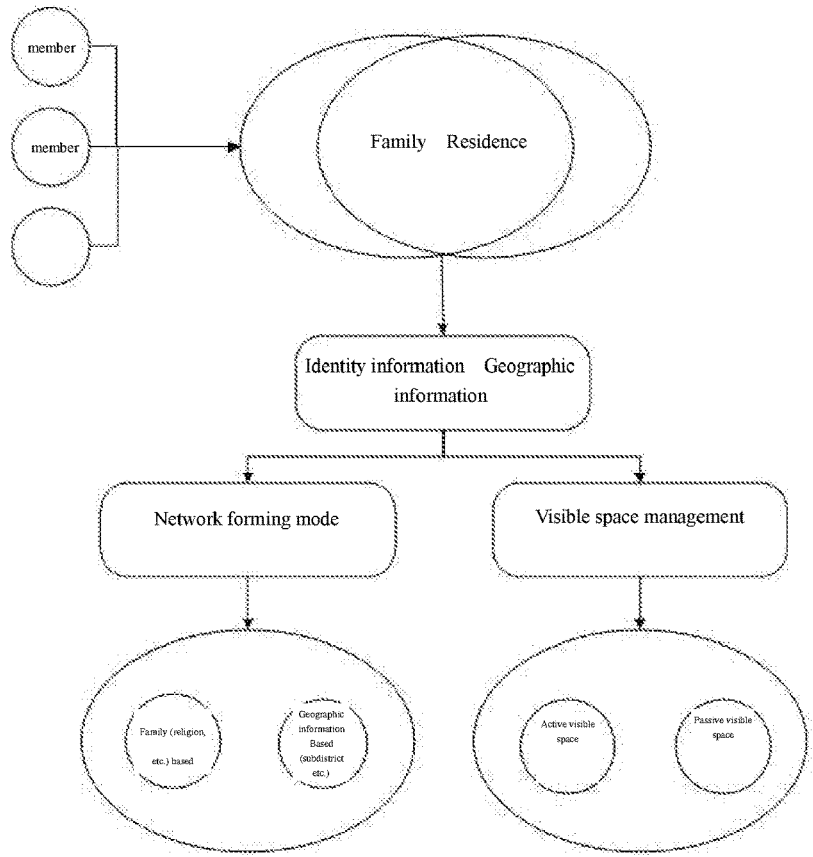
FIG. 2 is a schematic diagram of the community network according to an embodiment of the present invention.

FIG. 1 is a flow chart of a preferred embodiment of the geographic position information-based community interconnection method according to the present invention. The method may comprise the following steps:

S1. Creating a community network using geographic position information and identity information as network nodes. The community network uses geographic position information and identity information as network nodes. The geographic position information may be position information of a residence of a first user or position information of a business location of the first user. The identity information can be identification information that indicates the user identity, for example ID card information, passport information, household register information, of the first user. For example, the community network can use the identity information of a household head of the first user and the residence address of the first user to create the community network, as shown in FIG. 2.

Furthermore, the network nodes may further comprise user financial condition information, including credit classification on the first user. Geographic position information and identity information of the network nodes may be a basic credit class, which may be the basic credit for the first user to enter the community network. Furthermore, credit classes of the network nodes may be classified into a regular credit class and a network credit class according to the user financial condition information.

Regular credits can be generated on the basis that the first user creates a financial account for accumulating financial credits. The first user may actively participate in community activities to accumulate community credits. Based on these types of credits, the first user can act as a basic social production and service unit. The calculation method is: Regular credits=financial credit rating+community credit rating. The financial credit rating may be based on a curve of the user's financial account vs. time, expectancy, variance, and median. A static plus dynamic equation is used for the financial credit rating, and the equation may be as follows: $\beta X+(1-\beta)Y$ where X is fixed assets (will change along with the increase or decrease of current assets); Y is current assets (i.e. the average flow of assets over time); and $\beta$ is the calculation percent of fixed assets and current assets.

The community credit rating may be based on the credit rating accumulated by a family user through active participation in social networks. The family user may provide specific services to external networks, and obtain positive (or negative) feedback to accumulate the credit rating. The equation may be as follows: $\beta X-(1-\beta)Y$.

X is positive feedback, Y is negative feedback, and $\beta$ is the calculation percent of positive and negative feedbacks; generally, the percent of negative feedback may be higher.

Network credits can be generated based on: common resolutions from a network of acquaintances (when one's family is unable to support the desired credit class request. It may be necessary for a person to request support from a network of his/her own, and the credits that he/she can apply for may depend on the network support capability that said person could obtain through lobbying). In such a way, the family has the support from a network and the ability to gather social resources. Such a network can be expressed as a tree model in a computer. Naturally, the credit calculation result can vary along with changes to temporal and spatial environment. Therefore variance, expectancy and dynamic curves of multiple calculation results can be used to perform comprehensive analysis on the credit of a credit rating calculation subject. More importantly, the family user can naturally issue stocks, credits and the like based on said credit rating, which can significantly stimulate the vitality of the entire society. People can participate in politics and discuss politics with families as the basic unit, such that people can be better integrated into the country, the organizational form government can be further improved, and the country can have a powerful rallying force while being very vigorous.

The recursive equation of a network credit rating can be as follows:

$$\text{CreditRating}(i)=E_i*[P_i*A_i+\text{CreditRating}(i-1)]$$

$E_i$ represents a weight of the edge from a parent node of the node $A_i$ ($\text{Parent}(A_i)$) to itself ($A_i$). This weight can be set by $\text{Parent}(A_i)$, which indicates the support of intranet resources other than itself that it is willing to provide (i.e. the price of social relationship that it is willing to provide). When=0, Parent ($A_i$)=NULL (i.e. $A_i$ is a root node, which represents the network credit rating calculation subject), $E_0=1$; $P_i$ represents a weight of the node $A_i$ itself, which indicates the support of the node $A_i$. This weight is set by the node $A_i$ itself. $A_i$ represents the credit rating of the $i^{th}$ node in the network, and represents the credit rating of the $i^{th}$ family in the network credit rating calculation. When $i=0$, it represents the credit rating of the network credit rating calculation subject, for example the value of the equation 1. In the calculation process of the equation, each node can only be used once in the calculation.

Convergence modes of the equation may include limiting the number of network nodes, for example setting a maximum value for i or limiting the network depth, for example setting a network depth (for example for the tree depth, this network can be expressed as a tree model in a computer); or limiting the minimum network support, for example setting a minimum value $\text{MinE}_i$ for $E_i$ (when $E_i<\text{MinE}_i$, stop subsequent calculation of the network credit rating). Furthermore, convergence modes of the equation may be a combination of the above three modes.

S2. When the user terminal logs onto the community network for the first time, the user terminal can acquire the geographic position information and user identity information of the user terminal to complete registration and authentication.

If the user terminal logs onto the community network for the first time, the geographic position information and user identity information of the user terminal may not be a node of the community network. Therefore, it may be necessary to acquire the geographic position information and user identity information of the user terminal. With respect to the geographic position information, the global positioning system GPS may be used to determine the geographic position information of the user terminal. If the user terminal carries out online business through ADSL, cable TV or mobile network, the geographic position information of the current user terminal can be determined according to a subdistrict identification code ID of a subdistrict in which the current user terminal is located and through an operator. The geographic position information manually input by the first user can be acquired. With respect to the user identity information, the identity information of the geographic position owner may be acquired through the Internet or the identity information can be manually input by the first user.

Furthermore, said address and position information can correspond one-to-one to the user identity information. Each piece of geographic position information can be bundled only to one user's identity information. The geographic position information may be the position information of a residence of the first user or the position information of a business location. The geographic position information may be obtained from an operator of the fixed broadband used by the first user, or may be collected when the first user logs onto the community network through an indoor fixed device. For example, the geographic position information may be obtained by using a TV client to log onto the community network, then bundling the geographic position of the TV client and a TV code of the TV client, which can be used as the geographic position information.

The registration and completion of authentication can comprise a real-name authentication process. For example, a community network can be created in a fixed area, then an administrator may register the geographic position information of all houses in the community to a community server in advance. When a resident moves in, the administrator can enter the identity information of the household head of the resident (ID card information, employer, family members, etc.), associate the identity information of the household head with the geographic position information of the house to form a piece of real-name information, and activate this item.

When a resident uses a TV client to log onto the community network, the client can acquire the geographic position information and the TV identification information of the resident, and transmit the acquired geographic position information and the TV identification information of the resident to the community server. According to the information, the community server can query the memory unit of the server to determine whether the real-name information of said resident already exists. If the real-name information of said resident does not exist, the user terminal can prompt the first user to input the identity information of the household head (the ID card information of the household head is required, and other information is optional), and generate a piece of real-name information, said information uniquely identifying said resident (its initial visible space is empty, for example the information is externally invisible), and the user terminal activates the piece of real-name information. If the real-name information of the resident does exist, according to the basic information provided by the client, the user terminal can determine whether it is permitted to log on, and after the logon, the user terminal can automatically synchronize the information to be synchronized to the community server.

In an embodiment, when a resident uses a TV client to log onto the community network, the client can acquire the geographic position information and the TV identification information of the resident through a positioning module of the TV, prompt the first user to input the identity information of the household head (the ID card information of the household head is required, and other information is optional), and transmit said information to the community server. The community server can query the memory unit of the server whether the real-name information of said resident already exists. If the real-name information of the resident does not exist, the user terminal can generate a piece of real-name information, said information uniquely identifying said resident (its initial visible space is empty, for example, the information can be externally invisible), and the user terminal activates the piece of real-name information. If the real-name information of the resident does exist, according to the basic information provided by the client, the user terminal can determine whether it is permitted to log on, and after the logon, the user terminal can automatically synchronize the information to be synchronized to the community server.

In an embodiment, when a resident uses a TV client to log onto the community network, the client can acquire the geographic position information and the TV identification information of the resident through a positioning module of the TV, and prompt the first user to attach a magnetic card that contains the identity information, such as an ID card, to the TV identification module. The TV identification module can acquire the identity information of the household head, and connect with a public security system (or other identity management systems) for verification, when the verification is successful, and transmit the information (the geographic position information, the identity information, and the TV identification information) to the community server. The community server can query the memory unit of the server to determine whether the real-name information of said resident already exists. If the real-name information of said resident does not exist, the user terminal can generate a piece of real-name information, said information uniquely identifying said resident (its initial visible space is empty, for example the information is externally invisible), and activate the piece of real-name information. If the real-name information of said resident does exist, according to the basic information provided by the client, the user terminal can determine whether it is permitted to log on, and after the logon, automatically synchronize the information to be synchronized to the community server.

S3. The user terminal can receive information and/or services input by the first user for interaction, and upload the received information and/or services to the community server, said information and/or services for interaction being stored in a visible space of the user terminal.

Said visible space can comprise active visible space and passive visible space. Said active visible space can store information, services, and conditions actively exposed by said first user to other users. Said passive visible space can store various information, services, and conditions thereof released by other users to said first user. The community network can allocate an issuing space and a receiving space for the first user. Desired information, services, and conditions can be issued in the issuing space, and the issued information and/or services can be set to be visible to all people, or visible to some people, or visible to specific people. Various information, services, and conditions sent by other users to said first user can be displayed in the receiving space.

S4. When the user terminal logs onto the community network using a registered user account, the user terminal can acquire desired information and/or services by searching the information and/or services stored in the visible space.

The user terminal can log onto the community network using a registered user account, search desired information and/or services, and may also search for users that need it to provide services. It may also establish connection with other users through the geographic position information, and interact directly by clicking the second user's ID.

For example, a user B does not have time to buy food, or forgets to buy one certain kind of foodstuff, and at this moment, the user B may log onto the community network, and enter the food request into the active visible space. The user B may actively search for any food for sharing in the surrounding area, for example, search for any food for sharing in the subdistrict. With respect to a kind of food, the user B may search whether there is corresponding food for sharing in the surrounding area, for example, search whether there is a tomato for sharing in the surrounding area. Automatic matching may be set, for example, the community network can automatically match the initiated food request with the sharing food information in the surrounding area, and feed the match result back to the terminal that initiated the food request. If sharing food information corresponding to the food request is found through matching, then the geographic position information of the refrigerator of the corresponding sharing food information that has been uploaded can be transmitted to the terminal that initiated the food request. For example, the food request initiated by the user B can be matched with the sharing food information (tomato) of the user A. The geographic position information of the refrigerator for sharing said food may then be transmitted to the user B. The user B may find the user that shares said food according to the geographic position, and determine whether to obtain the food supply from the user A according to the information registration of the user A, and transmit the result to the user A.

The geographic position information can comprise, for example, a subdistrict, building, number, such that the user B can conveniently find the user A. The telephone number of the user A may also be provided.

Figure 3:
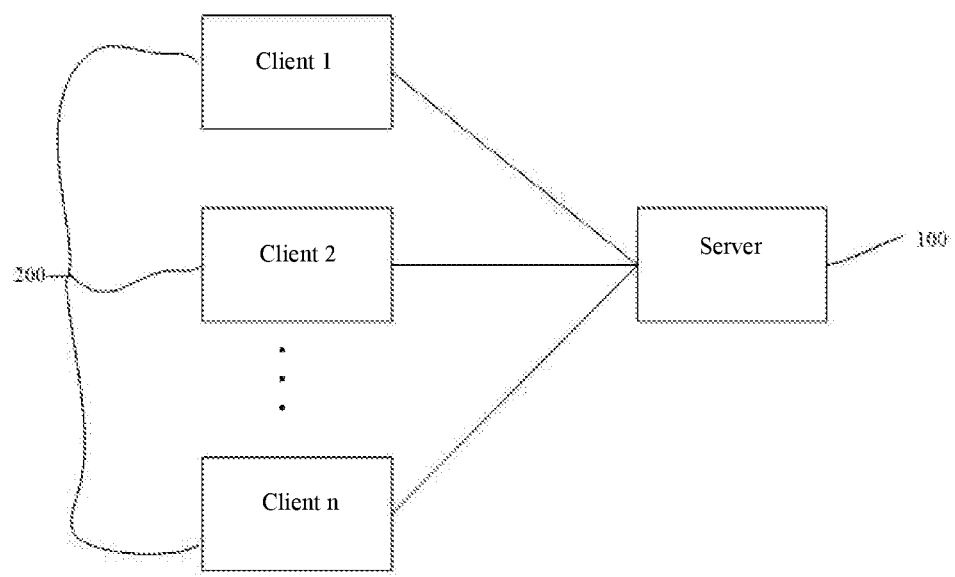
FIG. 3 illustrates the structure of the geographic position information-based community interconnection system according to an embodiment of the present invention.

The present invention can further provide a geographic position information-based community interconnection system. As seen in FIG. 3, said system can comprise a server 100 and a plurality of clients 200. Said server 100 can be configured to store information of community users.

Said clients 200 can be configured to log onto the community server, acquire the geographic position information and user identity information of the clients to complete registration and authentication, receive information and/or services input by the first user for interaction, upload the received information and/or services to the community server, store the received information and/or services in a visible space of the first user, and acquire desired information and/or services by searching the information and/or services stored in the visible space.

Said clients 200 can determine the geographic position information of the user terminal position via the global positioning system GPS. If the user terminal carries out online business through a mobile network, the clients 200 can determine the geographic position information of the position where the user terminal is at according to the subdistrict identification code ID of the subdistrict in which the user terminal is located and through a mobile operator. The clients 200 can acquire the geographic position information manually input by the first user.

All unit modules of the above geographic position information-based community interconnection system have been described in detail in the method above, and will not be repeated below.

The geographic position information-based community interconnection method and system provided by the present invention can create a community network using geographic position information and identity information as network nodes. When the user terminal logs onto the community network server for the first time, the user terminal can acquire the geographic position information and user identity information of the user terminal to complete registration and authentication. The user terminal can receive information and/or services input by the first user for interaction, upload the received information and/or services to the community server, and store the received information and/or services in a visible space of the first user. When the user terminal logs onto the community network using a registered user account, the user terminal can acquire desired information and/or services by searching the information and/or services stored in the visible space. With geographic position information and identity information as network nodes and by performing credit classification on the first user according to the user financial condition information, the user terminal can ensure the reliability of information on the community network, which fundamentally solves the problem of the reliability of various information and information releasers on the current virtual communities. It can be difficult for people to tell whether information is true or false, making it more difficult to acquire and utilize information and leading to less effective information dissemination.

A person skilled in the art should understand that all or some steps in the various methods in the embodiments above may be implemented by using a program to command relevant hardware, and the program may be stored in a computer readable memory medium, and the memory medium may comprise Read Only Memory (ROM), Random Access Memory (RAM), magnetic disks or optical disks.

It should be understood that, to a person skilled in the art, equivalent substitution or modification may be made according to the technical solutions and invention concept of the present invention, and all these modifications or substitutions shall be encompassed in the scope of the claims of the present invention.

The invention claimed is:

1. A geographic position information-based community interconnection method, comprising:

creating a community network using geographic position information and identity information as network nodes;

in response to a user terminal logging onto the community network for a first time, the user terminal acquires geographic position information and user identity information of the user terminal, and bundles the geographic position information and user identity information of the user terminal as a user identification to complete registration and authentication, wherein, at a same time as the user terminal acquires the geographic position information and user identity information of the user terminal, the user terminal further acquires user financial condition information, and performs a credit classification on a first user;

the user terminal receives at least one of information and services input by a first user for interaction, and uploads the received at least one of information and services to a community network server, wherein the received at least one of information and services for interaction are stored in a visible space of the user terminal;

in response to the user terminal logging onto the community network using a registered user account, the user terminal acquires desired at least one of information and services by searching the information and services stored in the visible space, wherein the user terminal searches for the desired at least one of information and services, and searches for users that need the user terminal to provide services, and the user terminal establishes connection with other users through the geographic position information, and the user terminal interacts with a second user by clicking the second user's ID, wherein the network nodes comprise a credit class of the user terminal, the credit class including a basic credit class, a regular credit class and a network credit class.

2. The geographic position information-based community interconnection method according to claim 1, wherein, in response to the user terminal logging onto the community network using a registered user account, the user terminal acquires the desired at least one of information and services by searching the information and services stored in the visible space, and acquires the geographic position information of the user terminal;

wherein, according to the geographic position information of the user terminal, the community server queries if said user information already exists, if the user information does not exist, the user terminal prompts the user to input the user identity information and generate a user identification;

if the user information does exist, according to the basic information provided by the first user, the user terminal determines whether the user is permitted to log on, and after the logon, the user terminal automatically synchronizes the information to the community server.

3. The geographic position information-based community interconnection method according to claim 1, including:

the user terminal acquires the desired at least one of information and services by searching the information and services stored in the visible space, verifies the credit class of said user terminal, and determines, according to the user terminal credit class, whether to select at least one of said information and services stored in the visible space or provide at least one of information and services.

4. A geographic position information-based community interconnection method, comprising:

creating a community network using geographic position information and identity information as network nodes;

in response to a user terminal logging onto the community network for a first time, the user terminal acquires the geographic position information and user identity information of the user terminal, and bundles the geographic position information and user identity information of the user terminal as a user identification to complete registration and authentication, wherein, at a same time as the user terminal acquires the geographic position information and user identity information of the user terminal, the user terminal further acquires user financial condition information, and classifies a credit class of the network credits into a regular credit class and a network credit class according to the user financial condition information, wherein the regular credit class comprises financial credit rating and community credit rating;

the user terminal receives at least one of information and services input by a user for interaction, and uploads the received at least one of information and services to a community network server, wherein the received at least one of information and services for interaction are stored in a visible space of the user terminal; and in response to the user terminal logging onto the community network using a registered user account, the user terminal acquires desired at least one of information and services by searching the information and services stored in the visible space of the user terminal.

5. The geographic position information-based community interconnection method according to claim 4, including:

determining the geographic position information of the user terminal via the global positioning system GPS.

6. The geographic position information-based community interconnection method according to claim 4, including:

in response to a current user terminal carrying out online business through ADSL, cable TV, or mobile network, the current user terminal determines the geographic position information of the current user terminal according to a subdistrict identification code ID of a subdistrict in which the current user terminal is located and through an operator.

7. The geographic position information-based community interconnection method according to claim 4, including:

acquiring the geographic position information manually input by the user.

8. The geographic position information-based community interconnection method according to claim 4, including:

acquiring the identity information of the geographic position owner through the Internet.

9. The geographic position information-based community interconnection method according to claim 4, including:

acquiring the identity information manually input by the user.

10. The geographic position information-based community interconnection method according to claim 4, wherein said visible space comprises active visible space and passive visible space, wherein said active visible space stores information, services, and conditions actively exposed by said user terminal to other user terminals;

wherein said passive visible space stores various information, services, and conditions released by other user terminals to said user terminal.

11. The geographic position information-based community interconnection method according to claim 4, including:

in response to a user terminal logging onto the community network using a registered user account, the user terminal acquires the geographic position information of the user terminal;

the community server queries if said user information already exists according to the geographic position information of the user terminal;

if the user information does not exist, the user terminal prompts the user to input the user identity information and generate a user identification;

if the user information exists, according to the basic information provided by the user, the user terminal determines whether the user is permitted to log on, and after the logon, the user terminal automatically synchronizes the information to the community server.

12. The geographic position information-based community interconnection method according to claim 11, including:

the user terminal acquires desired at least one of information and services by searching information and services stored in the visible space, verifies the credit class of said user terminal, and determines, according to the user terminal credit class, whether to select at least one of said information and services stored in the visible space or provide at least one information and services.

13. A geographic position information-based community interconnection system, wherein the geographic position information-based community interconnection system comprises:
a community server configured to store information of community users;
a client configured to log onto the community server, acquire a geographic position information and user identity information of the client and bundle the geographic information and user identity information of the client as a user identification to complete registration and authentication, acquire a financial condition information of the client to generate a credit class of the client, receive information and services input by a user for interaction, and upload the received information and services to the community server, wherein the client is further configured to acquire desired at least one information and services according to the credit class by searching the information and services stored in a visible space of the client.

14. The geographic position information-based community interconnection method according to claim 13, wherein said client is further configured to determine the geographic position information of the user terminal via the global positioning system GPS.

15. The geographic position information-based community interconnection method according to claim 13, wherein said client is further configured to, if the user terminal carries out online business through a mobile network, determine the geographic position information of the position where the user terminal is at according to a subdistrict identification code ID of a subdistrict in which a current user terminal is located and through a mobile operator.

16. The geographic position information-based community interconnection method according to claim 13, wherein said client is further configured to acquire the geographic position information manually input by the user.

* * * * *